United States Patent
Kumar et al.

(10) Patent No.: US 10,353,808 B2
(45) Date of Patent: *Jul. 16, 2019

(54) FLOW TRACING OF SOFTWARE CALLS

(71) Applicant: PayPal, Inc., San Jose, CA (US)

(72) Inventors: Abhinav Kumar, San Jose, CA (US); Bhaven Avalani, Cupertino, CA (US)

(73) Assignee: PAYPAL, INC., San Jose, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 14/922,372

(22) Filed: Oct. 26, 2015

(65) Prior Publication Data

US 2016/0048446 A1 Feb. 18, 2016

Related U.S. Application Data

(63) Continuation of application No. 13/078,677, filed on Apr. 1, 2011.

(51) Int. Cl.
  *G06F 11/36* (2006.01)
  *G06F 11/34* (2006.01)
  *G06F 8/70* (2018.01)

(52) U.S. Cl.
  CPC .......... *G06F 11/3688* (2013.01); *G06F 8/70* (2013.01); *G06F 11/3419* (2013.01); *G06F 11/3466* (2013.01); *G06F 11/3476* (2013.01); *G06F 11/3452* (2013.01); *G06F 2201/865* (2013.01); *G06F 2201/87* (2013.01)

(58) Field of Classification Search
  None
  See application file for complete search history.

(56) References Cited

U.S. PATENT DOCUMENTS

| | | | |
|---|---|---|---|
| 9,170,917 B2 | 10/2015 | Kumar et al. |
| 2007/0171844 A1 | 7/2007 | Loyd et al. |
| 2008/0201705 A1 | 8/2008 | Wookey et al. |
| 2009/0083715 A1 | 3/2009 | Dewitt, Jr. et al. |
| 2010/0281488 A1 | 11/2010 | Krishnamurthy et al. |
| 2012/0254900 A1 | 10/2012 | Kumar et al. |

OTHER PUBLICATIONS

"U.S. Appl. No. 13/078,677, Final Office Action dated Aug. 19, 2013", 24 pgs.
"U.S. Appl. No. 13/078,677, Non Final Office Action dated Mar. 3, 2015", 24 pgs.
"U.S. Appl. No. 13/078,677, Non Final Office Action dated May 2, 2013", 23 pgs.
"U.S. Appl. No. 13/078,677, Non Final Office Action dated Sep. 10, 2014", 24 pgs.

(Continued)

*Primary Examiner* — Craig C Dorais
(74) *Attorney, Agent, or Firm* — Maschoff Brennan

(57) ABSTRACT

In various embodiments, a system, method, and a computer-readable medium for performing operations for tracking numerous software calls in an enterprise environment is provided. The method includes tracking, during a runtime operation of an enterprise environment, layers through which software calls pass. The tracking includes logging physical components involved in each of the software calls, annotating each of the physical components with metadata that is directly indicative of each of the physical components, and logging a reliance of each of the physical components on others of the physical components. Other systems and methods are disclosed.

20 Claims, 10 Drawing Sheets

(56) References Cited

OTHER PUBLICATIONS

"U.S. Appl. No. 13/078,677, Notice of Allowance dated Jun. 15, 2015", 5 pgs.
"U.S. Appl. No. 13/078,677, Response filed Jun. 3, 2015 to Non Final Office Action dated Mar. 3, 2015", 16 pgs.
"U.S. Appl. No. 13/078,677, Response filed Aug. 2, 2013 to Non Final Office Action dated May 2, 2013", 13 pgs.
"U.S. Appl. No. 13/078,677, Response filed Nov. 19, 2013 to Final Office Action dated Aug. 19, 2013", 15 pgs.
"U.S. Appl. No. 13/078,677, Response filed Nov. 24, 2014 to Non Final Office Action dated Sep. 10, 2014", 14 pgs.

FLOW TRACING OF SOFTWARE CALLS

PRIORITY

This application is a continuation of and claims the benefit of priority to U.S. patent application Ser. No. 13/078,677, filed on Apr. 1, 2011, which is hereby incorporated by reference herein in its entirety.

TECHNICAL FIELD

The present application relates generally to the field of computer technology and, in a specific exemplary embodiment, to a system and method of to monitor and trace application calls in a diverse heterogeneous application environment.

BACKGROUND

As the complexity and throughput of application environments has increased, the technical challenges present in the monitoring, maintenance, and administration of such application environments have also increased commensurately. These technical challenges are particularly acute in enterprise application environments and Web-based (e.g., Application Service Provider (ASP)) environments, which may include a large number of applications, servicing a large number of users, and handling a large number of transactions. Consider, for example, a popular Web site that may be serviced by a rich application environment, including a large number of applications, and hosted on a collection of respective application servers. Such an application environment may include hundreds of diverse and heterogeneous applications, and may be required to handle millions of Uniform Resource Location (URL) requests, millions of e-mail messages, and billions of database inquiries (e.g., utilizing SQL statements) in a 24-hour period.

A failure in such an application environment can be disastrous, particularly where the application environment supports a live and real-time service (e.g., online or network-base commerce). The ability to monitor and quickly identify problems that may arise within an application environment is, of course, important for a number of reasons and presents a number of technical challenges.

BRIEF DESCRIPTION OF DRAWINGS

Various ones of the appended drawings merely illustrate exemplary embodiments of the inventive subject matter presented herein. Therefore, the appended cannot be considered as limiting a scope of the inventive subject matter.

DETAILED DESCRIPTION

The description that follows includes illustrative systems, methods, techniques, instruction sequences, and computing machine program products that embody various aspects of the inventive subject matter described herein. In the following description, for purposes of explanation, numerous specific details are set forth to provide an understanding of various embodiments of the inventive subject matter. It will be evident, however, to those skilled in the art that embodiments of the inventive subject matter may be practiced without these specific details. Further, well-known instruction instances, protocols, structures, and techniques have not been shown in detail.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on call tracing within an enterprise system, the embodiments are given merely for clarity in disclosure. Thus, any type of electronic commerce or electronic business enterprise system, including various system architectures, may employ various embodiments of the systems and methods as described herein, and are considered as being within a scope of the inventive subject matter described.

Figure 1:
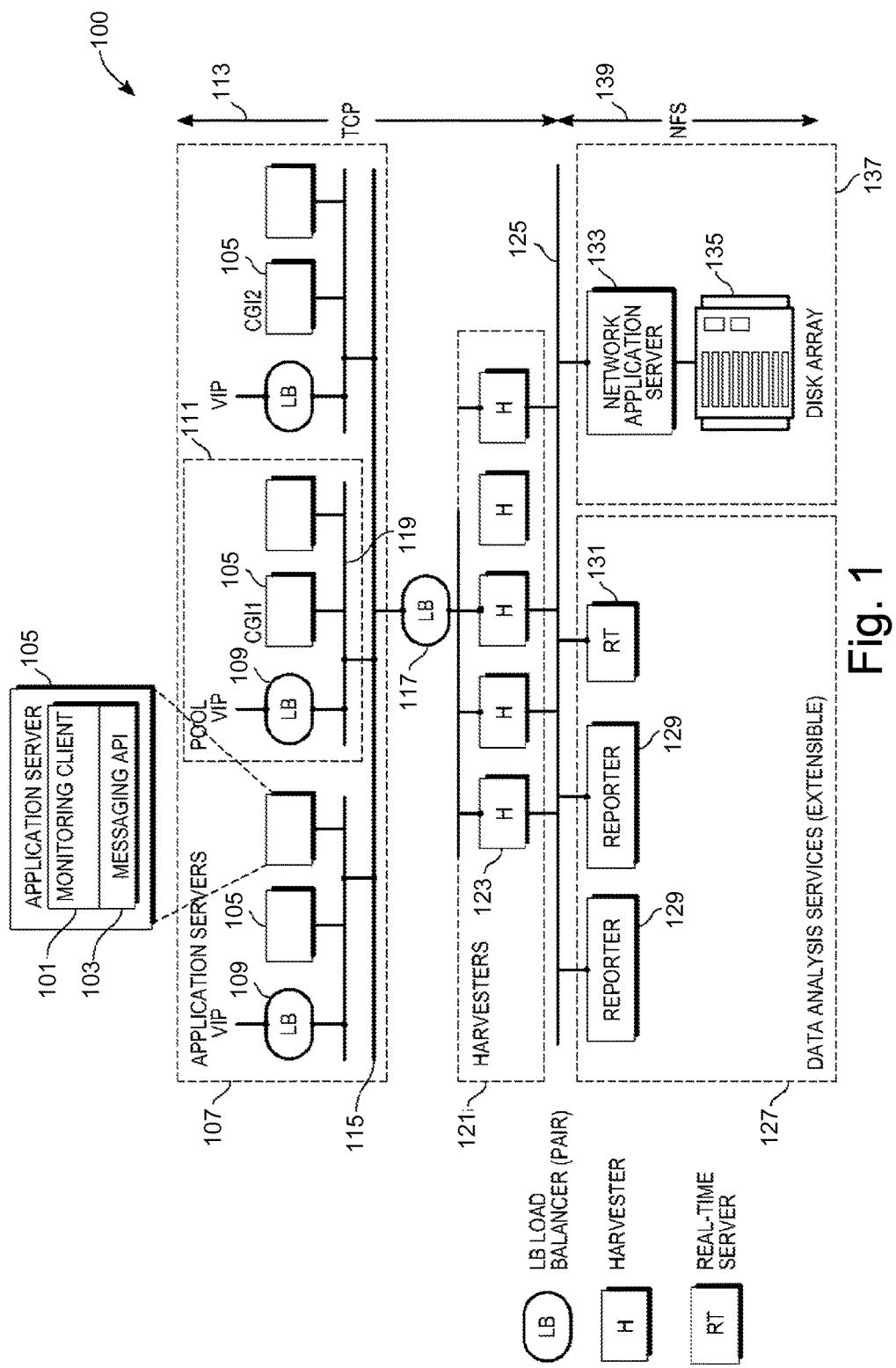
FIGS. 1 through 3 are block diagrams illustrating respective exemplary embodiments of systems to monitor a diverse and heterogeneous application environment.
Figure 2:
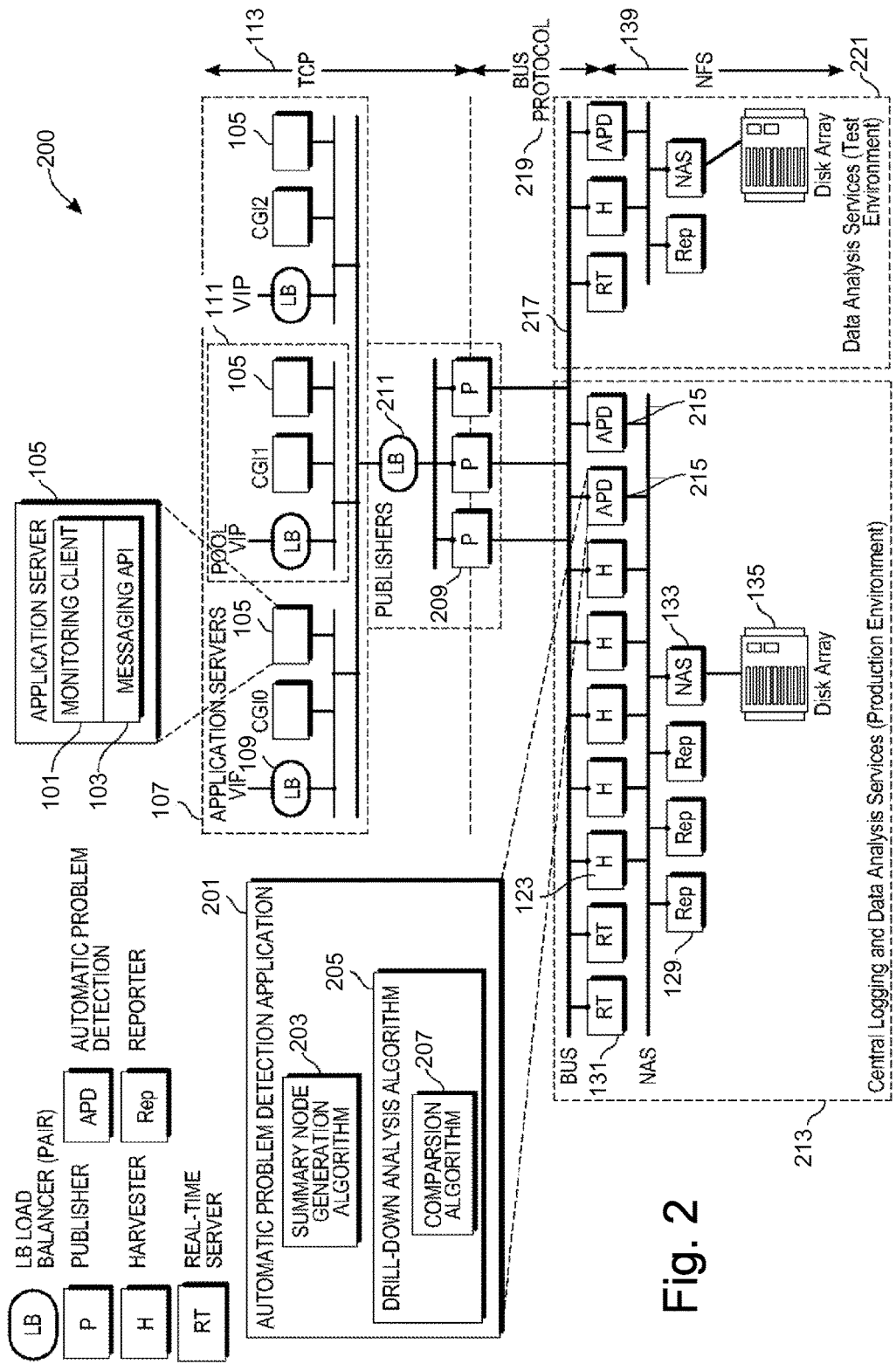
Figure 3:
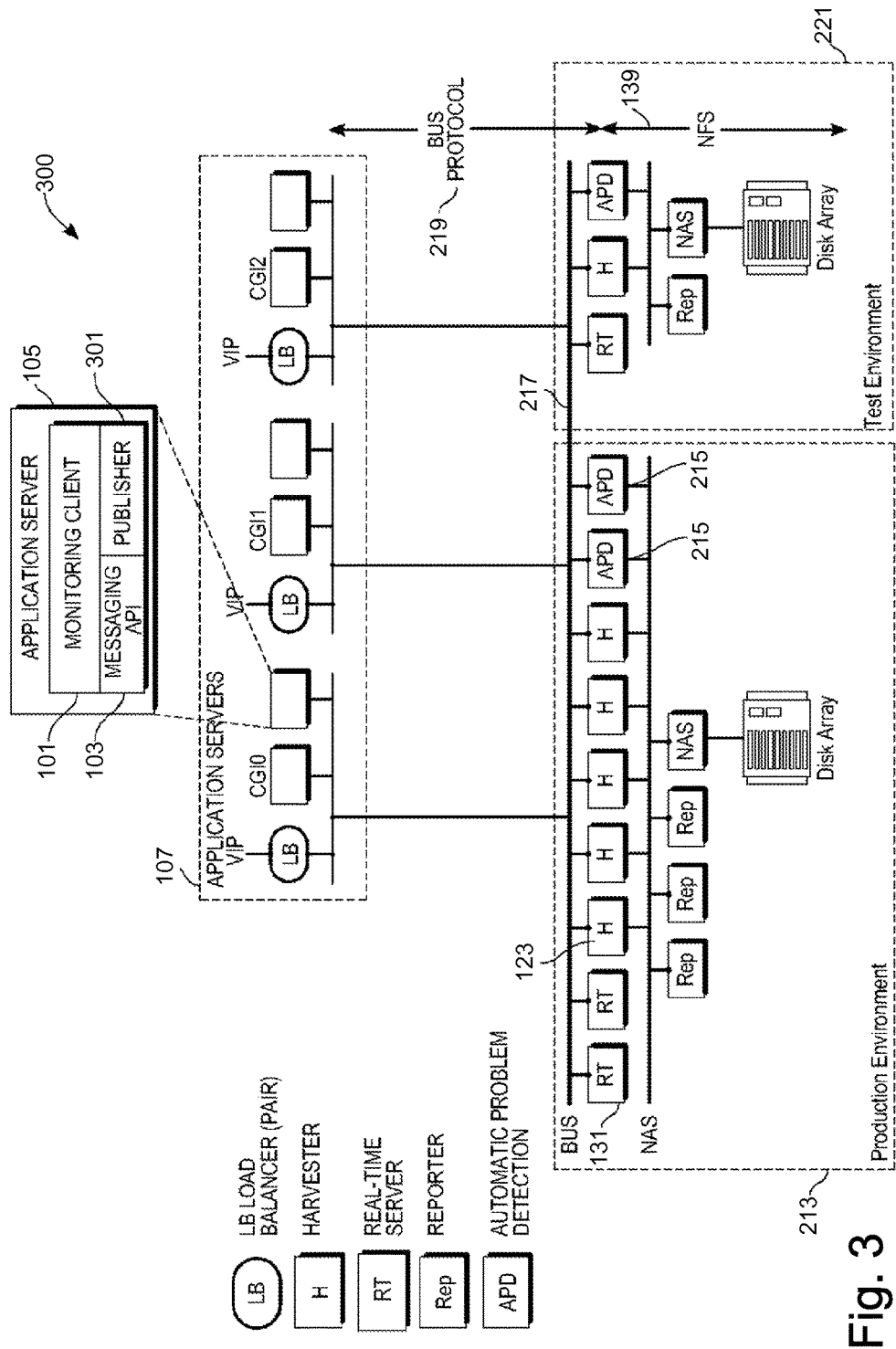

In various embodiments, the inventive subject matter describes tracking of software calls (e.g., requests) to multiple threads for processing in an enterprise system such as, for example, on on-line merchant system (e.g., eBay® Inc.). FIGS. 1 through 3 describe such an enterprise system and how calls can be tracked. For any given call or set of calls, described embodiments of the system draws a complete matrix dependency map showing both physical dependencies and logical dependencies underlying all incoming calls.

The dependency map that may be used for call tracing by developers to, for example, identify, view, and debug calls for latency issues. In various embodiments described in detail, below, the dependency map includes all layers involved (e.g., application layer, database layer, etc.) and includes all widgets involved. For example, the map may show what physical database(s) are required to process the call. The dependency map also includes runtime information from each of the various dependencies.

As an example, suppose there is an application for clothing, shoes, and accessories (CSA) that depends on information from a "Finding" component and information from a Metadata component. The Finding component is a physical component of CSA and, in turn, depends on, for example, "Service A" for "Geography 1" and further depends on "Service B" for "Geography 2." Plus, Service A depends on a particular physical database. A metadata component may be a logical component of CSA. In this example, nothing exists today to show that the database and the CSA are linked by dependencies. More details surrounding this example are given below with reference to FIG. 8.

One motivation behind the dependency map is to troubleshoot one or more calls that have longer response times than anticipated. The concept of "longer response times" is discussed in detail below with reference to FIG. 9 and statistical analysis generated. Various developers need an ability to identify the path of execution of the call (i.e., during runtime of the system), and narrow down the root cause of latency or performance issues. The map provides a visual graphical interface for developers along with reports that can help pinpoint the latency or performance issues.

In an exemplary embodiment, a method, and a related computer-readable medium to perform the method, for tracking numerous software calls in an enterprise environment is provided. The method includes tracking, during a runtime operation of the enterprise environment, layers through which each of the software calls passes. The tracking includes logging each of a multitude of physical components involved in each of the software calls, annotating each of the physical components with associated metadata, logging each of a multitude of logical components involved in the software calls, annotating each of the logical components with associated metadata, and logging a reliance of each of the physical components and the logical components on other physical and logical components. A dependency map is generated indicating the layers tracked in each of the software calls.

In another exemplary embodiment, a system to track numerous software calls in an enterprise environment including a cluster of harvesters and one or more reporters is discussed. The cluster of harvesters is arranged to track, during a runtime operation of the enterprise environment, layers through which each of the software calls passes. The tracking includes logging each of a multitude of physical components involved in each of the software calls, annotating each of the physical components with associated metadata, logging each of a multitude of logical components involved in the software calls, annotating each of the logical components with associated metadata, and logging a reliance of each of the physical components and the logical components on other physical and logical components. The reporters, in electronic communication with the cluster of harvesters, are arranged to generate a dependency map indicating the layers tracked in each of the plurality of software calls.

In another exemplary embodiment, a method for tracking numerous software calls in an enterprise environment is discussed. The method includes tracking, during a runtime operation of the enterprise environment, layers through which each of the software calls passes. The tracking includes logging each of a multitude of physical components involved in each of the software calls, logging each of a multitude of logical components involved in the software calls, and logging a reliance of each of the physical components and the logical components on other physical and logical components. A dependency map is generated indicating the layers tracked in each of the software calls. Each of these exemplary embodiments, and others, is discussed in detail, below.

With reference now to FIG. 1, block diagrams illustrating respective exemplary embodiments of a system 100 to monitor a diverse heterogeneous application environment are shown, according to aspects of the inventive subject matter. The monitored application environment may, for example, include a large number of applications, each hosted on a respective application server, and providing distinct application services. The diverse heterogeneous application environment may, for example, include applications providing, at one end of the spectrum, unrelated and distinct services or may include applications that provide distinct but partially or directly related services (e.g., purchase processes and billing services).

The system 100 is shown to include a cluster 107 of the application servers 105 coupled to, and in communication with, a cluster 121 of harvesters 123. The cluster 121 of harvesters 123 is coupled to an extensible collection of data analysis services 127 and a central logging system 137.

Returning to the cluster 107 of the application servers 105, pools 111 of the application servers 105 may be locally networked and associated with a load balancer 109, dedicated to each of the pools 111, which operates to balance a load between the application servers 105 within a particular one of the pools 111. The application servers 105, within a particular one of the pools 111, may provide a common set of application services.

Each of the application servers 105 is instrumented with one or more monitoring clients 101 that, as described in further detail below, monitors a predetermined set of activities and parameters of a host application server and communicates messages reflecting such activities and parameters utilizing a messaging Application Program Interface (API) 103. The messaging API 103 defines a common syntax, which is described more fully below, to communicate with the cluster 121 of the harvesters 123 and the central logging system 137. Although not required, the common syntax allows a "de-coupling" of the application servers 105 from the harvesters 123 and the central logging system 137.

Logging data, generated by the monitoring clients 101 and communicated by the messaging API 103, may be transmitted from one of the application servers 105 via a local pool network 119, and an application server network 115, to a load balancer 117, which distributes the messages to harvesters 123 included within the cluster 121. The harvesters 123 then operate to write logs, including the logging data received in the logging data messages, to a disk array 135 via a network 125 and a network application server (NAS) 133.

The data analysis services 127 may, as described in further detail below, include a number of services. In the exemplary embodiment illustrated in FIG. 1, a number of reporters 129 operate to generate periodic (e.g., hourly and daily) reports regarding activities and parameters of the application servers 105 utilizing the logs written into the disk array 135. Specifically, the reporters 129 may retrieve the logs from the disk array 135 via the network 125 and the network application server 133. The reports generated by the reporters 129 may be, for example, "static" reports, in that they present a static view of the logging data for a particular time period.

In contrast to the "static" reports generated by the reporters 129, real-time servers 131 operate to aggregate received logging data from the harvesters 123, via the network 125, in near real-time, and to present a number of near real-time views of activities and parameters pertaining to the application servers 105. For example, one or more real-time servers 131 may present aggregated statistics regarding the various parameters pertaining to individual ones of the application servers 105, or collections (e.g., the pools 111) of application servers, or of all applications across the entirety of the cluster 107 of the application servers 105.

In the system 100 illustrated in FIG. 1, communications between the application servers 105 and the cluster 121 of the harvesters 123 are shown to be performed utilizing the Transmission Control Protocol (TCP) 113. Communications between the harvesters 123, the real-time servers 131, the data analysis services 127, and the central logging system 137 are shown to be performed utilizing the Network File System (NFS) protocol 139, which is a client/application communication system allowing network users to access shared files stored on computers of different types.

The exemplary embodiments illustrated in FIGS. 2 and 3 are architected utilizing a publish/subscribe messaging communications system, which utilizes a publish/subscribe messaging bus to communicate messages between various entities.

Specifically, FIG. 2 is a block diagram illustrating a system 200, according to a further exemplary embodiment, to monitor a diverse, heterogeneous application environment. As with the system 100, described above with reference to FIG. 1, the system 200 includes a number of monitoring clients 101 that are utilized to instrument the application servers 105 included within the cluster 107 of application servers. The application servers 105 may also, as illustrated, be arranged in the pools 111. The architecture of the system 200 departs from that of the system 100 illustrated in FIG. 1 in that a publish/subscribe message bus communications protocol 219 is utilized to communicate logging data messages, generated by the monitoring clients 101 and conforming to the messaging API 103. Specifically, messages are communicated from the monitoring clients 101, utilizing the messaging API 103, to one or more publishers 209, via a load balancer 211. The logging data messages are then published by the publishers 209 onto a publish/subscribe messaging bus 217. The real-time servers 131, the harvesters 123, and one or more further data analysis services (e.g., an Automatic Problem Detection (APD) service provided by one or more APD servers 215) are instrumented with subscriber components and are accordingly able to subscribe to the logging data messages that are published by the publishers 209 onto the publish/subscribe messaging bus 217. The harvesters 123 then, in a similar manner as described above with reference to FIG. 1, communicate logging data to one or more reporters 129, and also write appropriate logs into the disk array 135 via the network application server 133. Communications between the harvesters 123, the reporters 129, and the disk array 135 are shown to be performed utilizing the Network File System (NFS) protocol 139. FIG. 2 illustrates that the collection of the real-time servers 131, the harvesters 123, the APD servers 215, the reporters 129, the Network Application Server 133, and the disk array 135 may be considered to be a central logging and data analysis service 213. FIG. 2 also illustrates that the system 200 may include a production environment of the central logging and data analysis service 213, as well as a test environment 221.

As noted above, the data analysis service 213 is shown to include one or more APD servers 215, each of which hosts an APD application 201. Each APD application 201 operates, in one example, to analyze logging data messages, received from the monitoring clients 101 via the publish/subscribe messaging bus 217 in near real-time to detect actual or potential problems and to generate alerts. These alerts may, in various embodiments, be connected to appropriate direct or indirect actions. To this end, each APD application 201 is shown in FIG. 2 to include a summary node generation algorithm 203 and a drill-down analysis algorithm 205. Each drill-down analysis algorithm 205 includes a comparison algorithm 207. The functioning of an exemplary embodiment of the APD application 201 is described in further detail below.

FIG. 3 is a block diagram illustrating a system 300, according to yet a further exemplary embodiment, to monitor a diverse and heterogeneous application environment. The system 300 is similar to the system 200 shown in FIG. 2, but differs in that the monitoring clients 101 no longer communicate with the publishers 209 utilizing TCP, but publish logging data messages directly onto the publish/subscribe messaging bus 217. To this end, each of the monitoring clients 101 is shown to incorporate a publisher component 301.

As is described above with reference to FIGS. 1 through 3, each of the application servers 105 is instrumented with one or more of the monitoring clients 101 that communicates logging data messages utilizing the messaging API 103. The logging data messages are reported to a central logging system and to data analysis services. The messages may be communicated utilizing any one, or combination of, a number of well-known communications and messaging protocols (e.g., a transport protocol (e.g., TCP), a messaging protocol (e.g., utilizing a publish/subscribe messaging bus such as the TIB, developed by Tibco® Software Inc., of Palo Alto, Calif.), or a network file sharing system (e.g., the NFS developed by Sun Microsystems®, Inc., of Santa Clara, Calif.)).

The various exemplary embodiments of a system to monitor an application environment, and described with reference to FIGS. 1 through 3, show increasingly heavy deployment of a publish/subscribe messaging bus to facilitate communications between various components of a system. In certain applications, the use of a publish/subscribe messaging bus may allow components to broadcast and receive logging data messages in an efficient manner, and to allow components to have the ability to perform work in parallel rather than in a serial manner. For example, rather than have a single component to receive a message, process the message, and then forward the original messages on to a downstream component, individual components may, utilizing a publish/subscribe message bus, be able to better utilize resources by concentrating solely on the local processing of received messages. The utilization of a publish/subscribe messaging bus architecture may also, in certain applications, enable scalability within a system by simplifying the action of adding a new hardware component. In one implementation, the publish/subscribe messaging bus 217 may allow a process or thread located anywhere within a system (e.g., the system 300) to be connected to the publish/subscribe messaging bus 217 and to communicate with all other processes connected to the same bus.

Regardless of the messaging/communication protocol utilized to communicate, each of the monitoring clients 101, with which the respective application servers 105 of an application environment are instrumented, may communicate with a central logging system, and data analysis services, utilizing a generalized version of the messaging API 103. This arrangement may provide certain advantages. For example, the unified and extensible logging of a set of diverse and heterogeneous applications may be enabled by instrumenting the application servers 105 utilizing the monitoring clients 101 that communicate in a common syntax supported by the messaging API 103. Further, the common syntax supported by the messaging API 103 may provide for the simplified instrumentation of the application servers 105.

Figure 4:
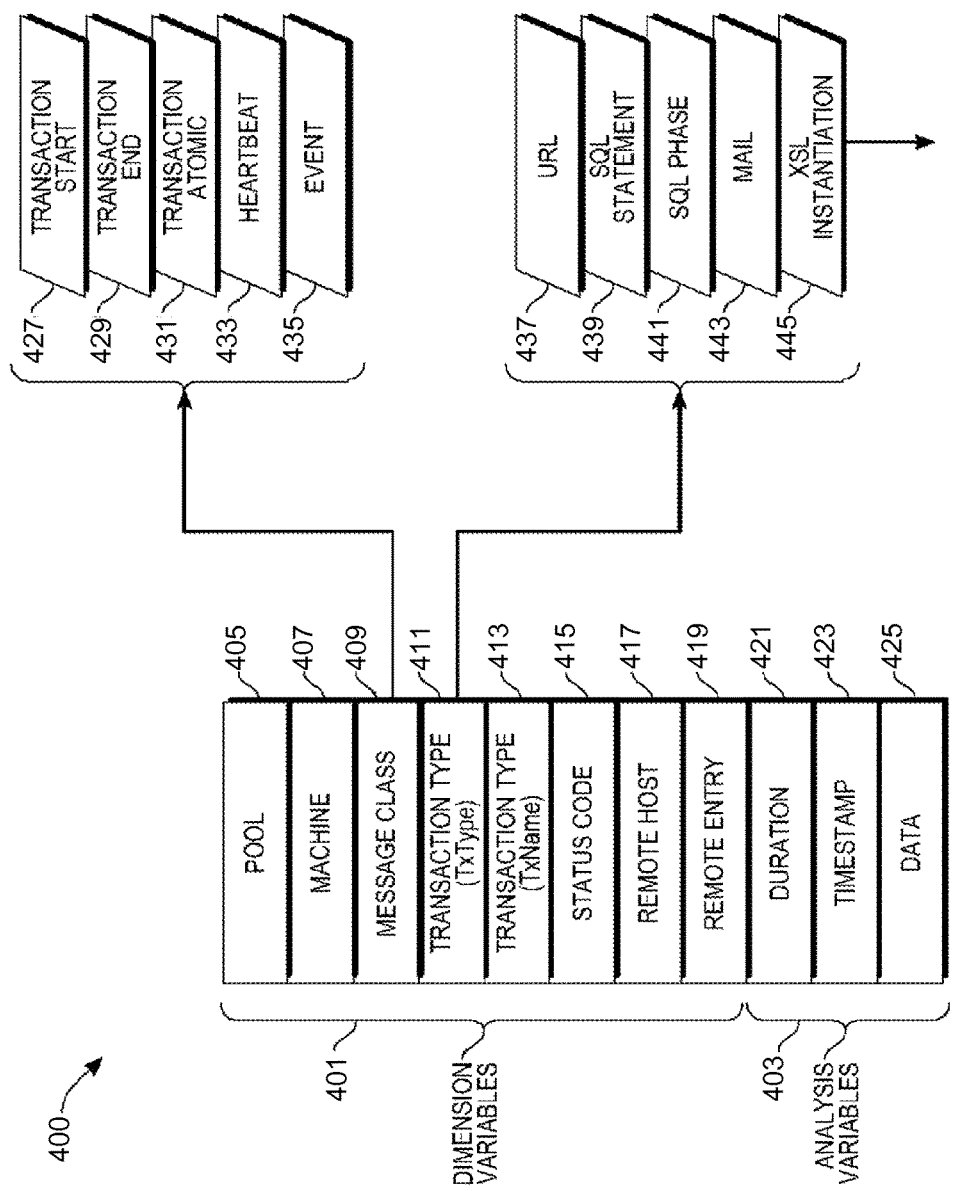
FIG. 4 is a diagrammatic representation of a data logging message, according to an exemplary embodiment, that may be generated by a monitoring client conforming to a messaging API.

Referring now to FIG. 4, a diagrammatic representation of a data logging message 400, according to an exemplary embodiment, is shown. The data logging message may be generated by one of the monitoring clients 101, conforming to the messaging API 103. In the exemplary embodiment, the data logging message 400 is generated, by a respective one of the monitoring clients 101, for each observed transaction pertaining to a monitored application. Each of the monitoring clients 101 may be adapted to monitor a specific application, or application type, within a diverse and heterogeneous application environment. Regardless of the diversity of applications monitored, each of the monitoring clients 101 may utilize the messaging API 103 to communicate logging data messages conforming to a common syntax, such as that described with reference to FIG. 4. For the purposes of the present specification, the term "transaction," to which a particular data logging message 400 may pertain, may be regarded as a flow of processing or a unit of work that takes time to complete (e.g., a flow that has a start and an end).

Further, a transaction may optionally be regarded as either being successful or unsuccessful. Consider that if a transaction fails, an error code may identify the type of error that caused the transaction to be unsuccessful. Further, each of the monitoring clients 101 may include a precision timer (not shown) allowing the monitoring clients 101 to determine the time taken for a transaction to complete.

Transactions, monitored by a respective one of the monitoring clients 101, may furthermore be classified as being of a particular transaction type according to a predefined set of transaction types. For example, in one embodiment, a predefined set of transaction types may include URL, SQL, e-mail, XSLT, Logic, SQLOpen, SQLExe, and SQLFetch transactions, for example. However, any number of transaction types may be defined.

Transactions may also be nested. For example, an SQL transaction may be nested within a URL transaction and an XSLT transaction may be nested in an e-mail transaction, which is in turn nested in a URL transaction. For each transaction observed by the monitoring clients 101, one or more of a data logging message 400 may be generated.

Turning now specifically to the example of the data logging message 400 shown in FIG. 4, each message may include a number of fields. An exemplary syntax is provided below.

A pool dimension variable 405 may indicate one or more of the pools 111 of the application servers 105 from which the data logging message 400 originated. Similarly, a machine dimension variable 407 indicates a specific machine (e.g., one of the application servers 105) from which the data logging message 400 originated.

Each data logging message 400 further includes a message class dimension variable 409 that, in the exemplary embodiment, identifies the message as belonging to one of five classes namely:

1. A Transaction Start class 427;
2. A Transaction End class 429;
3. A Transaction Atomic class 431;
4. A Heartbeat class 433; and
5. An Event class 435.

Messages of the Transaction Start class 427 and the Transaction End class 429 identify the start and end of transactions, as may be observed by one or more of the monitoring clients 101 with respect to a monitored application. Messages of the Transaction Start class 427 and the Transaction End class 429 are normally utilized to report detected transactions or events pertaining to a particular transaction. Exemplary formats for messages of the Transaction Start class 427 and the Transaction End class 429 may be:

t <timestamp> <type>
//... nested messages
T <timestamp> <type> <name> <status> <duration> <data>.

As is described below, in the event that no nested transaction messages are generated, a message of the Transaction Atomic class 431 may be generated. Messages belonging to the Transaction Atomic class 431 facilitate optimization of message communication and generation in that, if there are no other messages between a Transaction Start and a Transaction End, only a single message, of the Transaction Atomic class 431, is written. Accordingly, in an exemplary embodiment, the monitoring clients 101 may perform a "lazy" evaluation of a transaction start, in that a message of the Transaction Start class 427 is only written if a subsequent event, pertaining to the relevant transaction, is registered prior to the transaction end. An exemplary format for a message of the Transaction Atomic class 431 may be:

A<timestamp><type><name><status><duration><data>.

Messages of the Heartbeat class 433 may report statistical "heartbeats" concerning certain applications; the "heartbeats" being computed internally and logged at regular intervals. It will be appreciated that the statistics may be highly application dependent, or may be more general (e.g., percentage CPU utilization and percentage memory utilization). An exemplary format for a message of the Heartbeat class 433 is:

H<timestamp><type><name><status><data>.

Messages of the Event class 435 (Event Messages) are "catch all" messages for other types of messages that may not be transaction or heartbeat messages. As such, Event messages are for recording "instantaneous" and "aperiodic" actions. A non-instantaneous "event" may be more appropriately considered to be a Transaction. Likewise, a periodic action may be more appropriately considered to be a Heartbeat. An exemplary Event in the current embodiment is for acknowledging the detection of service Mark-Down. Information included within a message of the Event class 435 may include warning, error, exception, or other types of internal data specific to a particular environment. The format of an exemplary message of the Event class 435 may be:

E<timestamp><type><name><status><data>.

The data logging message 400 may also include a transaction type dimension variable 411, which is a character string that stores information indicating the type of a particular transaction to which the message pertains. For example, where the heterogeneous application environment being monitored is supporting a website, the transaction type may identify the transaction as being of a URL type 437, a SQL statement type 439, an SQL phase type 441, an e-mail type 443, or an XSL instantiation type 445, to name a few examples.

The data logging message 400 may also include a transaction name dimension variable 413, which is a character string that further identifies the particular instance of the transaction type (e.g., for a URL transaction type, the specific URL function within an application, e.g., "ViewItem").

A status code dimension variable 415 may indicate the status of the logged transaction data (e.g., whether a transaction was successful or unsuccessful) and also a specific error that resulted in the transaction being unsuccessful, if this is the case.

A duration variable 421 stores information indicating a time (e.g., in milliseconds) that a monitored application spent executing a particular transaction. A timestamp variable 423 contains information indicating a time at which a relevant transaction may have started. Finally, a data variable 425 stores a list of name-value pairs pertinent to a monitored transaction (e.g., name=value & . . . & name=value).

As noted, certain of the variables within the data logging message 400 may be classified as the dimension variables 401, whereas others may be classified as analysis variables 403. Specifically, the dimension variables 401 may, in various embodiments, be utilized to aggregate data in different dimensions. The analysis variables 403, on the other hand, are simply aggregated across data sets determined by a dimensional analysis. Expressed differently, the dimension variables 401 may be regarded as identifying where in "space" certain data originated, and the analysis variables 403 variables encode values at points identified by the combination of the dimension variables 401. In various embodiments, a mapping (e.g., a function) may map a domain to a range. The domain may be defined as a vector space made up of the dimension variables (e.g., Pool, Machine, Message Class, Message Type, Message Name, Message Status, and also Message Time). The range may be defined as the analysis variables 403. Without any aggregation, the only visible one of the analysis variables 403 may be Transaction duration, although the values in the data variable 425 portion of the data logging message 400 may also include the analysis variables 403 (which may require the inclusion of the names from the data as additional ones of the dimension variables 401). An aggregation operation transforms this vector space, so that one or more dimension variables are dropped, but analysis variables are added. For example, aggregation can be performed in the time dimension by dropping the seconds and milliseconds dimensions, and adding the analysis variables 403 Transactions per second, Average Transaction duration, Events per second, and Average Value per second for each Heartbeat, for example. Also, as described in more detail below, various additional statistical information may be gleaned from the collected data.

Figure 5:
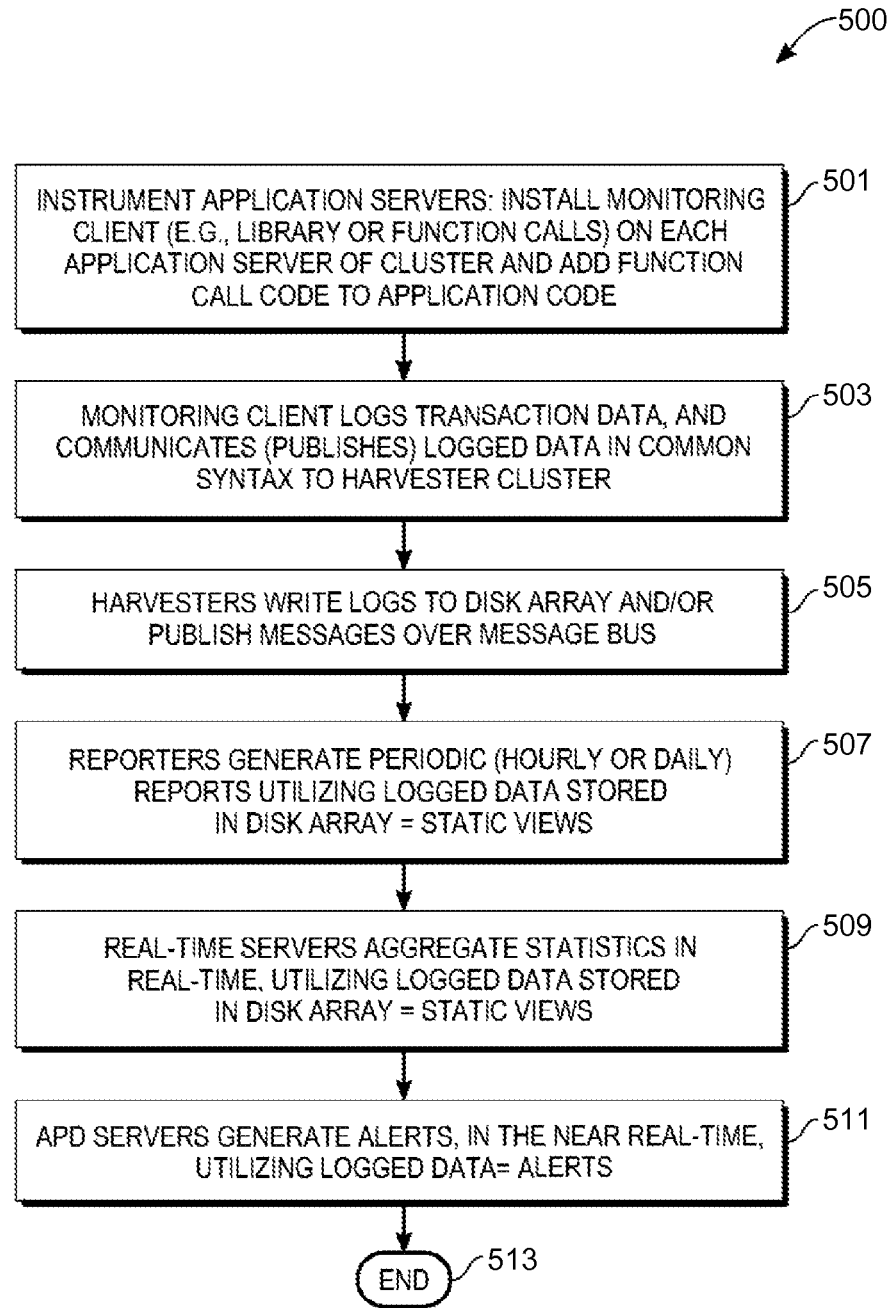
FIG. 5 is a flowchart depicting a method, according to an exemplary embodiment, to monitor a diverse and heterogeneous application environment.

FIG. 5 is a flowchart depicting a method 500, according to an exemplary embodiment, to monitor a diverse and heterogeneous application environment. The method 500 is described as being performed within the context of any one of the architectures described in FIGS. 1 through 3.

At operation 501, an operator of the diverse and heterogeneous application environment instruments each of the application servers 105 by installing one or more of the monitoring clients 101 on, or making the monitoring clients 101 available to, each of the application servers 105. The operator may also add additional code to a monitored application to make function-calls to a library of functions that may constitute the monitoring clients 101.

Further details regarding interactions between the application servers 105 and the monitoring clients 101, according various embodiment, will now be discussed. In an embodiment, the monitoring clients 101 may constitute a library of functions that are linked to a monitored one of the application servers 105. If no modifications or changes are made to the application servers 105, then the functions within the relevant library are simply unused and monitoring of the application servers 105 by the monitoring clients 101 may not occur. In an embodiment, each monitored application of the application servers 105 (or each the application servers 105) may be instrumented by the addition of code to the monitored application, in the form of calls to the library of functions that constitute the monitoring clients 101. Calls to the library of functions result in messages being generated, packaged, and sent from the monitored ones of the application servers 105 or the monitoring clients 101 to the central logging and data analysis service 213.

According to an exemplary approach to logging, transactions may be regarded as being an occurrence (or operations) to instrument. Some transactions to instrument may be entry point transactions, and exit point transactions. Consider that the application servers 105 typically operate to provide a service. External applications (e.g., a web browser or a further application server in a multi-tiered enterprise architecture) may make requests to a particular one of the application servers 105. The particular one of the application servers 105 receives the request, performs an action, and returns a response. The performed action (or work) may be regarded as a transaction that can be instrumented. In an embodiment, such transactions may be labeled "root" or "level 0" transactions. Other transactions that the application servers 105 execute are typically nested inside a root transaction. An application log (e.g., for one thread of execution in the application) may be recorded as a sequence of root transactions.

Consider that, in a simple web server, the root transaction may be of the type URL. A billing application server, on the other hand, is typically not implemented as a web server and may accordingly not serve URL requests. Nonetheless, a billing application server will typically still have a main entry point, where it processes requests that might be called of type "billing." Several different kinds of billing requests may be served by an exemplary billing application server. For example, the billing application server might allow for the collection of payment from a user for the purchase of an item utilizing different payment methods. One billing transaction name might be, for example, "ChargeCreditCard," while another transaction name might be "ChargeCheckAccount." Any particular application server may have only one type of "root transaction," but this is not required.

In an embodiment, it may be desirable to instrument both an entry point transaction and exit point transactions as noted above. An exit point transaction may be where a specific one of the application servers 105 utilizes the services of an external server (e.g., the application server takes on the role of a client in a different client-server transaction). An exemplary case is where the application servers 105 make use of one or more external database servers (e.g., performs an SQL transaction). However, there may be many different kinds of exit point transactions. Continuing the above example, where the application servers 105 make use of an external billing application server, a relevant one of the application servers 105 will have an exit point transaction where it performs a call to the external billing one of the application servers 105.

In an embodiment, it may be useful to instrument both ends of a client-server transaction. Earlier, an entry point transaction was identified as potentially being regarded as a root transaction. Similarly, an exit point transaction may be regarded as a "leaf" transaction and may appear in an application log as an atomic transaction. An exemption to this rule may be when a leaf transaction has an error of some kind that results in multiple events being logged. In such cases, the relevant leaf transaction would be logged as a non-atomic transaction.

As noted above, in an embodiment, transactions may be regarded as important occurrences and the application servers 105 may be instrumented at operation 501 accordingly. Events may, in various embodiments, also be regarded as important to log, and the application servers 105 may also be instrumented to facilitate the logging of events. In an embodiment, events may be logged whenever there is a significant change of state, or when an error is detected at a location in code of a particular one of the application servers 105 that is not directly related to a particular transaction in progress.

Further, the application servers 105 may be instrumented to log "heartbeats" when the logging of transactions may be prohibitively expensive. For example, where a number of memory allocations made per second, statistics about the size of memory allocation requests, and even an amount of time (e.g., in nanoseconds) that it takes to perform each memory allocation are of interest, it will be appreciated that the logging of each memory allocation would be prohibitively expensive from a resource and bandwidth computational perspective. While it would of course be possible to instrument memory allocation functions and to perform aggregation and analysis of information so gleaned, the overhead costs associated with doing so may not be justifiable. Accordingly, for certain types of information, there are advantages to generating a heartbeat (e.g., once every second or once every minute) to facilitate the logging of this type of information.

With continued reference to FIG. 5, at operation 503, each of the installed ones of the monitoring clients 101 or the application servers 105 logs transaction data and, utilizing the messaging API 103, communicates the logging data in a common syntax to the cluster 121 of the harvesters 123. In the exemplary system shown in FIG. 1, the logging data may be communicated as the data logging message 400 (see FIG. 4) to a cluster of the harvesters 123. Alternatively, in the system 300 shown in FIG. 3, the logging data may be published, as a data logging message 400, by one or more of the monitoring clients 101 utilizing, for example, the publisher component 301, directly over the publish/subscribe messaging bus 217.

As noted above with respect to the description of the data logging message 400, each of the monitoring clients 101 may, at operation 503, monitor and log a wide variety of types of data. The data may include origin information, in the form of pool and machine information, indicating an origin of the data logging message 400, message class information, transaction name and type information, status information, duration information, timestamp information, and other miscellaneous data. These data may then be formatted according to the messaging API 103 as a data logging message 400 conforming to a common syntax.

At operation 505, the harvesters 123, having received one or more of the data logging message 400, write logs into the disk array 135 via the network application server 133. The logs written into the disk array 135 are used by the reporters 129 to generate the static reports providing snapshot and historical information pertaining to the cluster 107 of the application servers 105.

At operation 507 the reporters 129, for example, via the network 125, access the log information within the disk array 135 and generate periodic (e.g., hourly or daily) reports utilizing the logging data stored in the disk array 135.

At operation 509 the real-time servers 131 aggregate statistics in real-time utilizing messages received from the harvesters 123 as well as historical data retrieved from the disk array 135. The messages communicated from the harvesters 123 typically include the same information as contained in a data logging message 400. However, the formatting of such messages may vary in order to facilitate writing of the logging data into the disk array 135. Nonetheless, the real-time servers 131 are able to receive and process this information to generate the aggregate statistics in near real-time.

Similarly, at operation 511, the APD servers 215 (described above with reference to FIGS. 2 and 3) utilize the logging data contained within the data logging message 400 to detect actual and potential issues in near real-time, generate alerts, and, where appropriate, initiate preventive or corrective actions. Further details regarding the operation of the APD application 201 is described in further detail below. The method 500 then terminates at operation 513.

Figure 6:
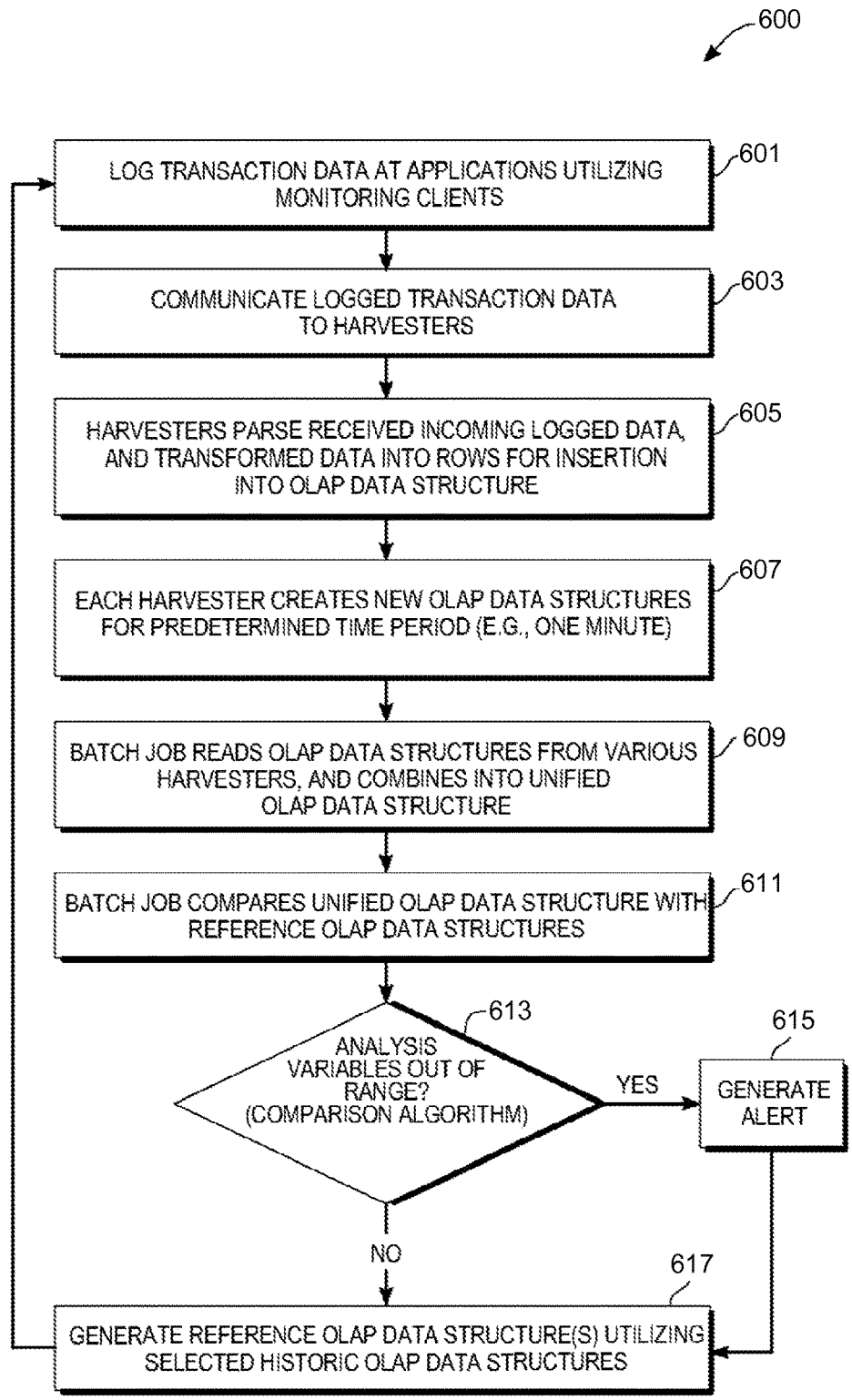
FIG. 6 is a flowchart illustrating a method, according to one exemplary embodiment, to perform automatic problem detection within a diverse and heterogeneous application environment.

With concurrent reference to FIG. 2, FIG. 6 is a flowchart illustrating a method 600, according to an exemplary embodiment, for performing automatic problem detection within a diverse and heterogeneous application environment. At a high level, the method 600 can comprise two phases running simultaneously in a pipeline. The two phases include an aggregation phase, whereby logged transaction data are aggregated, and an analysis phase, wherein the aggregated data are analyzed. In one embodiment, the logged transaction data may be aggregated in a current time period (e.g., a current minute), while the analysis is performed on data aggregated with respect to a previous time period (e.g., a previous minute). The method 600 may be performed, as noted above, by the APD application 201 executing on each of the APD servers 215 and the harvesters 123.

In an embodiment, the aggregation of the logged transaction data by the APD application 201 may be viewed as transforming the logged transaction data into heartbeats. The analysis by the APD application 201 is performed on the heartbeats. Considering again the example in which aggregation is performed on one-minute intervals, at the end of each minute, a set of statistics may be transferred to the drill-down analysis algorithm 205 to analyze. As the data are transferred once per minute, the data may thus be regarded as heartbeat data. The aggregation may therefore be viewed as occurring in the time dimension in order to do the transfer to heartbeats. However, the APD application 201 may also operate to aggregate in various space dimensions. For example, for each transaction time and for each one of the pools 111 (see FIG. 1), the APD application 201 may aggregate over all machines within the cluster 107 and produce heartbeat data. The heartbeat data can include, for example, the rate of transactions per minute per transaction type per pool or the average transaction duration per type per pool.

In an embodiment of the APD application 201, the heartbeat information may be stored internally within the memory of the APD servers 215 and thus not be encoded as heartbeat messages that are communicable on the publish/subscribe messaging bus 217. In alternative embodiments, the APD servers 215 may support two tiers: a first-tier responsible for the aggregation and the publication of heartbeat messages onto the publish/subscribe messaging bus 217, and a second-tier listening for heartbeat messages on the publish/subscribe messaging bus 217, receiving such heartbeat messages, and performing analysis and alert functions utilizing data contained in the heartbeat messages. The two-tier architecture may provide certain advantages in that it may provide improved scalability for higher volumes of traffic and may also facilitate the dissemination of heartbeat data to other services beyond Automatic Problem Detection.

Concerning the scalability of Automatic Problem Detection functionality, for a large application environment, a number of aggregators may be required, each aggregating only a subset of information received from a cluster 107 of application servers. Further, it may also be desirable to split the analysis function among various nodes according to analysis function. Of course, in one embodiment in which the two-tier approach is followed, the analysis may be performed in just one node of the second tier and this one node performs analysis for all traffic (e.g., log transaction data transfer).

Regarding the availability of heartbeat information to other services, an example of such a further service may be the real-time analysis services provided by the real-time servers 131 shown in FIGS. 2 and 3 to be coupled to the publish/subscribe messaging bus 217. In a single-tier embodiment, the real-time servers may also transform transactions (and events) into heartbeats, thus duplicating operations that are also being performed by the APD application 201. Where the APD servers 215 support a two-tier architecture, consider the exemplary embodiment described above where information that is sent to the real-time servers 131 is in the form of one-second heartbeats. Although the APD servers 215 are described as generating one-minute heartbeats, the APD servers 215 may nonetheless be computing a wider range of statistics than the real-time servers 131. Accordingly, the two-tier architecture for the APD servers 215 may be utilized to consolidate certain aggregation operations that are leveraged for automatic problem detection purposes and for real-time report generation purposes. Of course, any number of other services may also subscribe to aggregate information generated. The method 600 provides one example of how the aggregation and analysis operations described above may be performed.

With continued reference to FIG. 6, the method 600 commences at operation 601 with the logging of transaction data at the various applications hosted on the application servers 105, utilizing the monitoring clients 101 as described above. At operation 603, the logged transaction data are then communicated by the monitoring clients 101, utilizing the messaging API 103, to the harvesters 123 and the APD servers 215. This communication of information may occur via any of the systems described above with reference to FIGS. 1 through 3, for example.

At operation 605, the harvesters 123 perform data analysis on the incoming logged transaction data. Specifically, the harvesters 123 perform limited real-time analysis on the data logging message 400 (see FIG. 4) with a view to transforming the raw data into rows of data that can be inserted into an On-line Analytical Processing (OLAP) data structure that for the purposes of the present specification is labeled as a multidimensional cube or, more simply, a cube. As noted above, the data logging message 400 includes both the dimension variables 401 and the analysis variables 403. Utilizing the data logging message 400, the harvesters 123 are able to create various types of transaction tables.

Moving on to operation 607, each of the harvesters 123 creates a new OLAP data structure for regular, predetermined time intervals (e.g., every minute). In an embodiment, the cube is formed as an in-memory data structure optimized for speed. The cubes may be written to a disk and then later read back into memory but, in an embodiment, operations are performed on a cube only when in memory. Working with an in-memory data structure can place a limit on the number of rows that can be inserted into the cube but the cube data structure may take advantage of redundancy in data to achieve a high degree of compression.

At operation 609 a batch job, forming part of the APD application 201, reads all of the cubes created by the harvesters 123 for a predetermined time interval (e.g., one minute) and combines the cubes into a cluster-wide, unified cube (e.g., into a single cube for all data received from the cluster 107 of the application servers 105) for the predetermined time interval. The creation of the unified cube (or OLAP data structure) generally takes less than the predetermined time interval for which the cubes are generated in order to prevent the batch job from falling behind in the creation of unified cubes.

At operation 611, the batch job proceeds to compare the unified cube with reference OLAP data, termed a "range cube," so as to detect "out-of-range" deviations between the unified cube and the range cube. The range cube may be drawn from a predetermined number of previous cubes, different numbers of which may have been selected for different time periods. For example, the range cube may be generated utilizing an immediately previous 60 cubes representing activity within the cluster 107 of the application servers 105 within the last hour, a second predetermined number of cubes from a prior week, plus a further predetermined number of cubes from two weeks prior, and so on.

The comparison of the unified cube with the reference OLAP data may include identifying the analysis variables 403 (e.g., analysis variables that may be included within raw logging data or analysis variables that are derived from information included within the raw logging data) for multiple ones of the dimension variables 401 or combinations of the dimension variables 401, and determining whether the analysis variables 403 are within an acceptable range.

At decision operation 613, the comparison algorithm 207 of the APD application 201 determines whether any of the analysis variables 403 are out of range. If so, at operation 615 the APD application 201 may cause the issuing of an appropriate alert and also possibly the initiation of preventive or corrective actions (e.g., human or automated actions). In the event that none of the analysis variables is out of range, the method 152 proceeds to operation 617 where an updated reference OLAP data structure (e.g., a range cube) is generated utilizing selected OLAP data structures. The method 600 then loops back to operation 601.

Further detail regarding comparison operations that may be performed at operation 611 are now described. As will be appreciated, raw logging data may include a limited number of raw analysis variable information (e.g., transaction duration information derived from a duration variable 110 of the data logging message 400). However, the summary node generation algorithm 203 of the APD application 201 is able to derive further ones of the analysis variables 403, not necessarily included within the data logging message 400, from the data included within the data logging message 400. To this end, the summary node generation algorithm 203 may generate a collection of derived ones of the analysis variables 403.

For any given dimensional analysis (i.e., an analysis performed on any of the dimension variables 401), a summary table (discussed with reference to FIG. 7, below) may be generated in which many transactions are summarized per row based on a dimension variable. The degree of summarization may depend upon a hierarchy defined with respect to the dimension variables 401. For example, at a highest level of summarization, a simple table could indicate a total for a number of errors detected across the entirety of the cluster 107 of the application servers 105.

Figure 7:
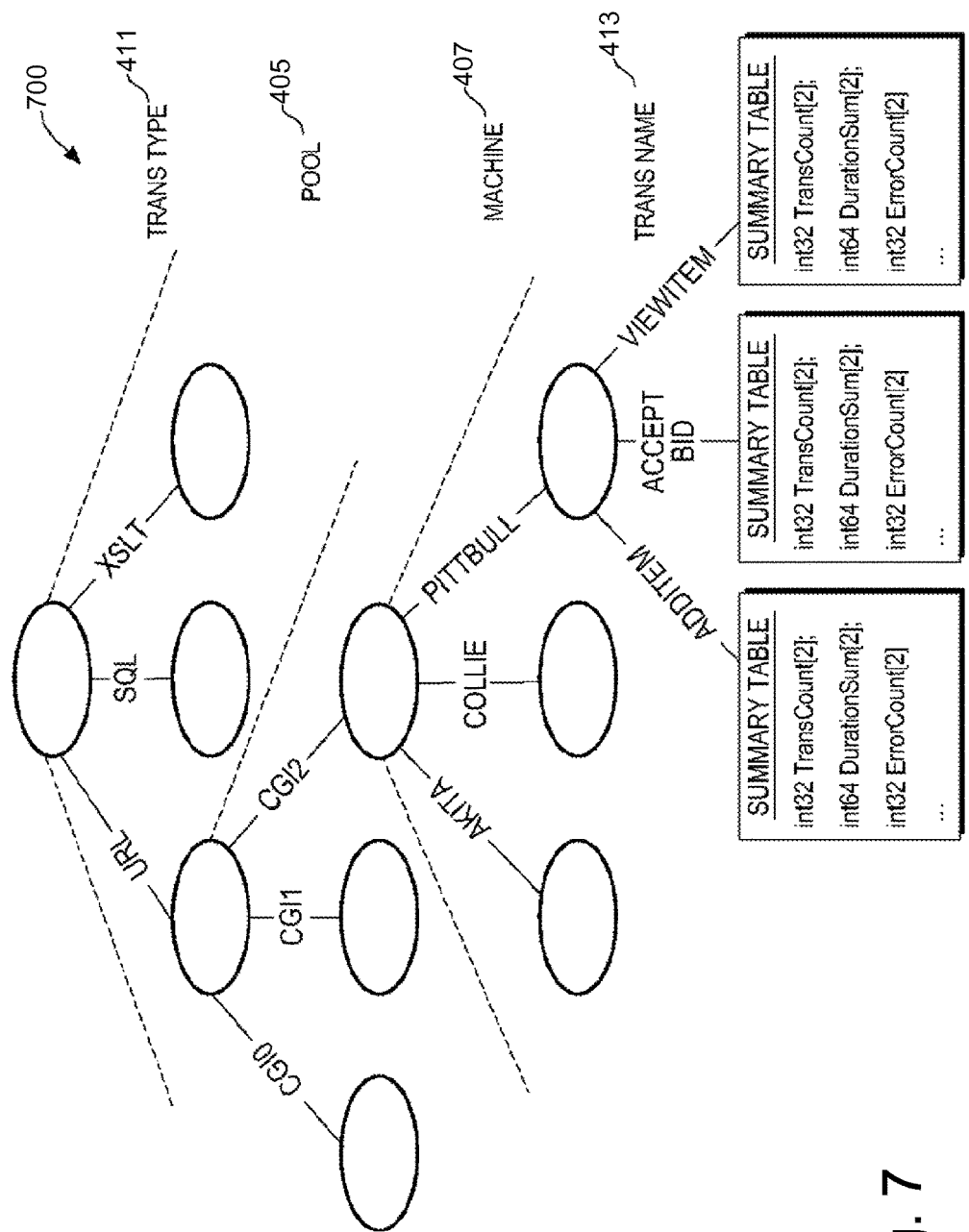
FIG. 7 is a diagrammatic representation of a dimensional hierarchy, according to an exemplary embodiment.

FIG. 7 is a diagrammatic representation of a dimensional hierarchy 700, according to an exemplary embodiment of the present invention. The dimensional hierarchy 700 is, in one embodiment, generated by the drill-down analysis algorithm 205 of the APD application 201, and stored in memory (e.g., a Random Access Memory (RAM)), of each of the APD servers 215. Depending on the type of drill-down analysis that may be required, the drill-down analysis algorithm 205 may generate any number of dimensional hierarchies (or trees) 700 to support an appropriate analysis. For example, in a further exemplary version of the dimensional hierarchy 700, the transaction type dimension variable 411 may be connected to a root of the dimensional hierarchy 700, and any one of the dimensional variables may be regarded as a child of the transaction type dimension variable 411.

The dimensional hierarchy 700 shown in FIG. 7 is shown to support a drill-down analysis through the transaction type dimension variable 411, the pool dimension variable 405, the machine dimension variable 407, and the transaction type dimension variable 411. Each of the nodes within the dimensional hierarchy 700 may have one or more summary tables associated therewith summarizing various analysis variables at a particular level of the dimensional hierarchy 700. The dimensional hierarchy 700 and the summary tables associated with each of the nodes support an effective drill-down analysis of logging data generated by the monitoring clients 101 deployed within the cluster 107 of the application servers 105.

As discussed above, the summary tables, generated by the summary node generation algorithm 203 for each node of the dimensional hierarchy 700, may summarize logging data pertaining to a pre-determined time window or interval (e.g., a minute preceding a current minute in which the summary table is viewable).

The unified OLAP data structure may be a multi-dimensional cube, with all dimensions of the cube being regarded as independent and mathematically equal. Accordingly, an analysis within the framework of a dimensional hierarchy could be started utilizing any dimensional variable. The dimensional hierarchy 700 begins utilizing the transaction type dimension variable 411, but any of the dimension variables could be utilized as the start dimension variable.

Dependency Matrices

As noted in the discussions above with reference to FIGS. 1 through 7, applications in general rely heavily on other services, both hardware and software. From a high level consideration, components can be broken down into two major areas—physical components and logical components. As discussed, physical components can include, for example, load balancers, databases, servers, and routers. Logical components can include, for example, widgets, libraries, and other services. Certain websites can receive billions of requests (e.g., search queries) per day. In order to improve and maintain the overall system, a complete dependency matrix can be developed, based at least partially on concepts discussed, above, with reference to FIG. 1 through 7. The dependency matrix ties all physical and logical components together.

For example, to a first order, an end-user's activities on a website can be tracked. For example, the end-user enters a site at web page A, moves to web page B, and then on to web page C. The concept of tracking the end-user's movements through a website is known independently in the art as flow tracking Mere flow tracking provides some insight for future system development, but is limited in the amount of feedback available to system architects and engineers for maintaining and developing sites and associated systems to support the sites.

From a system architectural standpoint, the design of the system is known. However, with billions of requests daily, how the overall system actually operates can only be known at runtime. A dependency matrix can include metrics, metadata, and other aspects of the system in a runtime mode of operation. Metrics can include factors such as system and individual component performance, errors, and count. The metadata can include factors such as what application is running on a particular system and what version of the code is running on each component. Additionally, the matrix dependency can provide geographical information including, for example, which data center (e.g., United States versus India versus China) is handling particular requests and which components within those data centers are handling particular requests or portions of requests. Each of these concepts is discussed in more detail, below, with reference to FIGS. 8 and 9.

Figure 8:
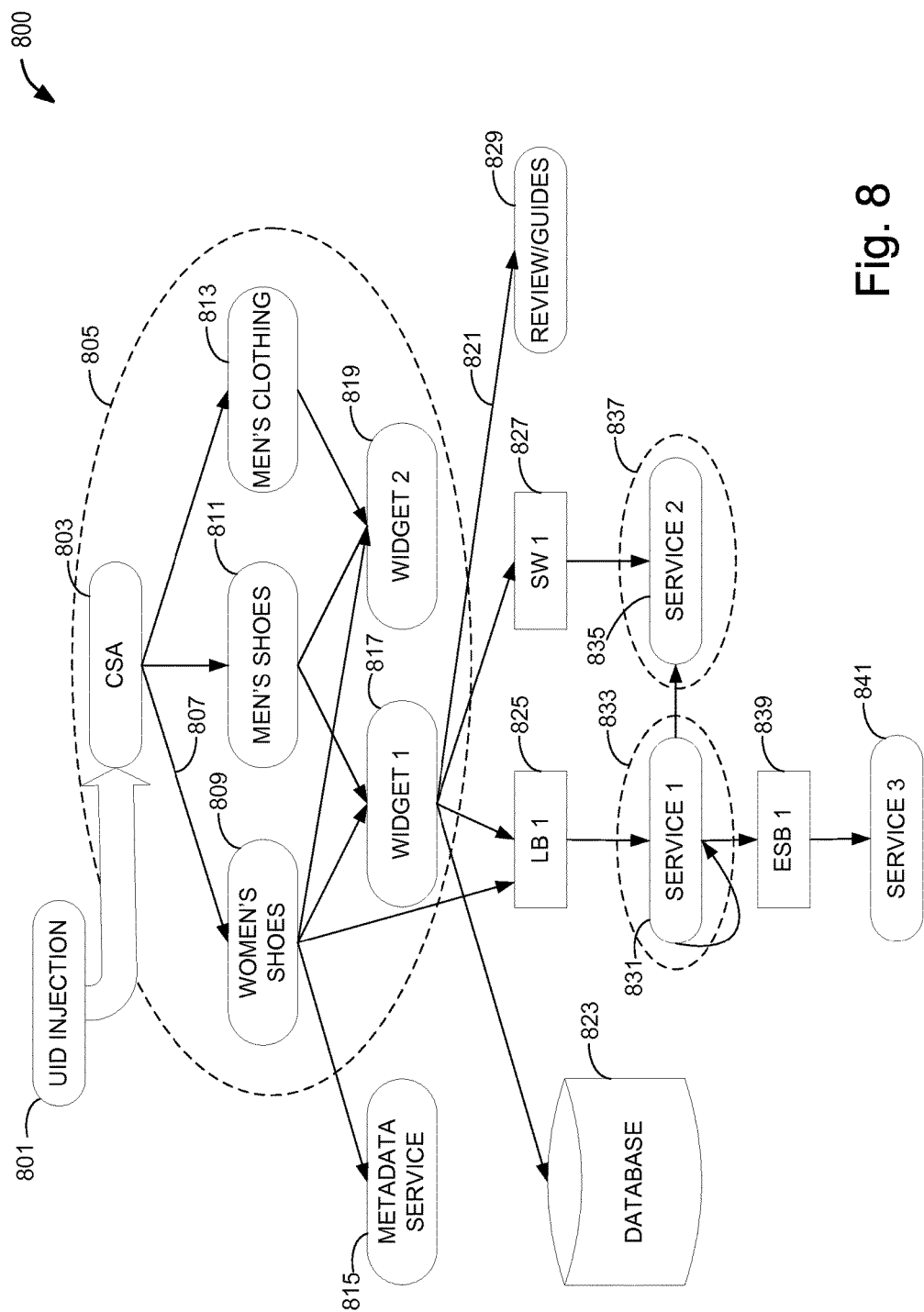
FIG. 8 is an exemplary diagram of a matrix dependency map, partially developed using concepts discussed with reference to FIG. 1 through 7.

Referring now to FIG. 8, an exemplary diagram of a matrix dependency map 800 is shown to include a number of physical components, logical components, and regions. The matrix dependency map 800 is provided merely as a high-level example to assist a skilled artisan in understanding the concepts of the inventive subject matter discussed herein in a more concrete sense. As noted, the matrix dependency map 800 annotates and logs transactions in a runtime condition using principles, systems, and methods described above.

The matrix dependency map 800 is shown to include various logical components including various web pages (a clothing, shoes, and accessories (CSA) page 803, a women's shoes page 809, a men's shoes page 811, and a men's clothing page 813), a metadata service module 815, a first widget 817, a second widget 819, a first 831, a second 837, and a third 841 service component, and a review module 829. The matrix dependency map 800 is also shown to include various physical components including a database 823, a load balancer 825, a switch 827, and an enterprise service bus (ESB) 839. The matrix dependency map 800 is further shown to include various geographical regions including a first physical boundary 805, a second physical boundary 833, and a third physical boundary 837. A unique identifier (UID) injection module 801, also shown in the matrix dependency map 800, is discussed in detail, below.

Not all of the components underlying the matrix dependency map 800 are described in detail. They are provided merely as an example of how various aspects of the inventive subject matter may function. Further, although all of the components are not described in detail, a skilled artisan will readily recognize and understand the details of each component based on common components known independently in the art when combined with the description provided herein. Additionally, each of the components shown in the matrix dependency map 800 may be similar to other components discussed above with reference to FIGS. 1 through 3. For example, various ones of the load balancers and databases may be similar to or the same as those already discussed.

With continued reference to FIG. 8, consider now an exemplary embodiment of an implementation of the matrix dependency map 800. An end-user accesses a web page through a request (for example, through the end-user conducting a search for clothing, shoes, or accessories). A result from the search lands the end-user on the CSA page 803. The end-user then makes a determination which of the sub-pages within the CSA page 803 the end-user next chooses to visit. Assume the end-user proceeds to the women's shoes page 809. A determination, during an operation 807, is then made of how long the system takes to access the page (e.g., 150 msec). The system further annotates and records the underlying hardware (e.g., a server or a load balancer, not shown explicitly in FIG. 8), versions of code (e.g., one or more applications) on which the page runs, and reliance and other software and hardware services. Each of these transactions is logged and recorded according to methods and systems described above. For example, the cluster 121 of the harvesters 123 (FIG. 1) may be used to track and log the various transactions. The women's shoes page 809 relies upon a first widget 817 and a second widget 819. Each of the components just discussed and as shown lie within the same first physical boundary 805 (e.g., in San Jose, Calif.). The women's shoes page 809 also relies on, for example, the metadata service module 815 and the load balancer 825 that lie outside the first physical boundary 805 in another geographical location.

Assume the end-user next clicks on a link (not shown directly) within the women's shoes page 809. The link accesses the first widget 817 that is communicatively coupled to the review module 829 or guide. The review module may contain further information on a selected pair of shoes displayed or described within the women's shoes page 809. The further information is displayed within the women's shoes page 809 for the end-user. During the access to the review module 829, a determination is made, at operation 821, of any errors encountered by the first widget 817 in accessing the review module 829. As with the operation 807 described above, additional related information, such as access time, errors, underlying hardware, versions of code on which the page runs, and reliance or other software and hardware services, is logged, annotated, and recorded. As shown, the first widget 817 can also access the database 823 directly or other services through the load balancer 825 or the switch 827.

A first service 831 is geographically located within the second physical boundary 833 (e.g., in Shanghai, China) while the second service 835 is geographically located within the third physical boundary 837 (e.g., in Phoenix, Ariz.). Should the first widget 817 access, for example, the first service 831, the system will record the route taken including the load balancer 825 (along with software running thereon), the second physical boundary 833 (for an indication as to where the service is located), and any additional services or hardware either accessed by or accessible from the first service 831. For example, the first service 831 may access itself in an iterative manner, or access the third service 841 through the ESB 839. (An ESB generally refers to a software architecture construct, which may be implemented by middleware infrastructure products.)

Thus, the system provides for a mapping of all of the physical and logical dependencies including access times, path routing, errors encountered, physical locations of various components, and a variety of other parameters for a system during runtime operation. For example, in various embodiments, the dependency mapping may be generated by the reporters 129 (FIG. 1) after receiving the tracked and logged data from the harvesters 123. In other embodiments, other components may be used to track and log the data and generate the dependency maps. Once the dependency maps are generated, and, since each of the separate access times are annotated for each path, for example, an accurate determination can be made by tracing each path independently to look for any problems or bottlenecks (i.e., Automatic Problem Detection). Thus, unlike current technologies that evaluate only access ties through an entire system, the inventive subject matter described provides a much higher level of granularity to pinpoint any potential and troubleshoot problems. All of the collected information can be invaluable in triaging, debugging, capacity utilization determinations, and cloud implementations.

With continued reference to FIG. 8, the UID injection module 801 can "inject" a UID signal from a call (e.g., a request) at any entry point within the system. In other words, call-tracing can begin at any chosen point within the system. Once injected, the UID signal can be traced (e.g., call-traced) wherever it "travels" throughout the system. All related metadata, as outlined above, can be recorded and associated with the UID signal. A new UID signal is generated for each new request coming into the system. As noted above, there can be billions of requests coming into the system daily. Consequently billions of UID signals can also be generated, tracked, and have all relevant metadata recorded.

The UID signal is associated with a request and not necessarily with an individual end-user (i.e., the UID signal is not necessarily a user-identification). Consequently, call-tracing, in the various embodiments, uniquely identifies a call as originated from a web page (such as the CSA page 803), and trace the calls path of execution through all logical components that participate in the call along with a physical view of the trace (Data Center/Pool/Machine/information on every hop).

Enough metadata may be collected from each UID signal to tie together all portions of the systems and form statistical analyses of the system based on the metadata. The statistical data can include, for example, average performance metrics, median performance metrics, and performance metrics of a pre-determined percentile (e.g., $95^{th}$ percentile or $99^{th}$ percentile).

Figure 9:
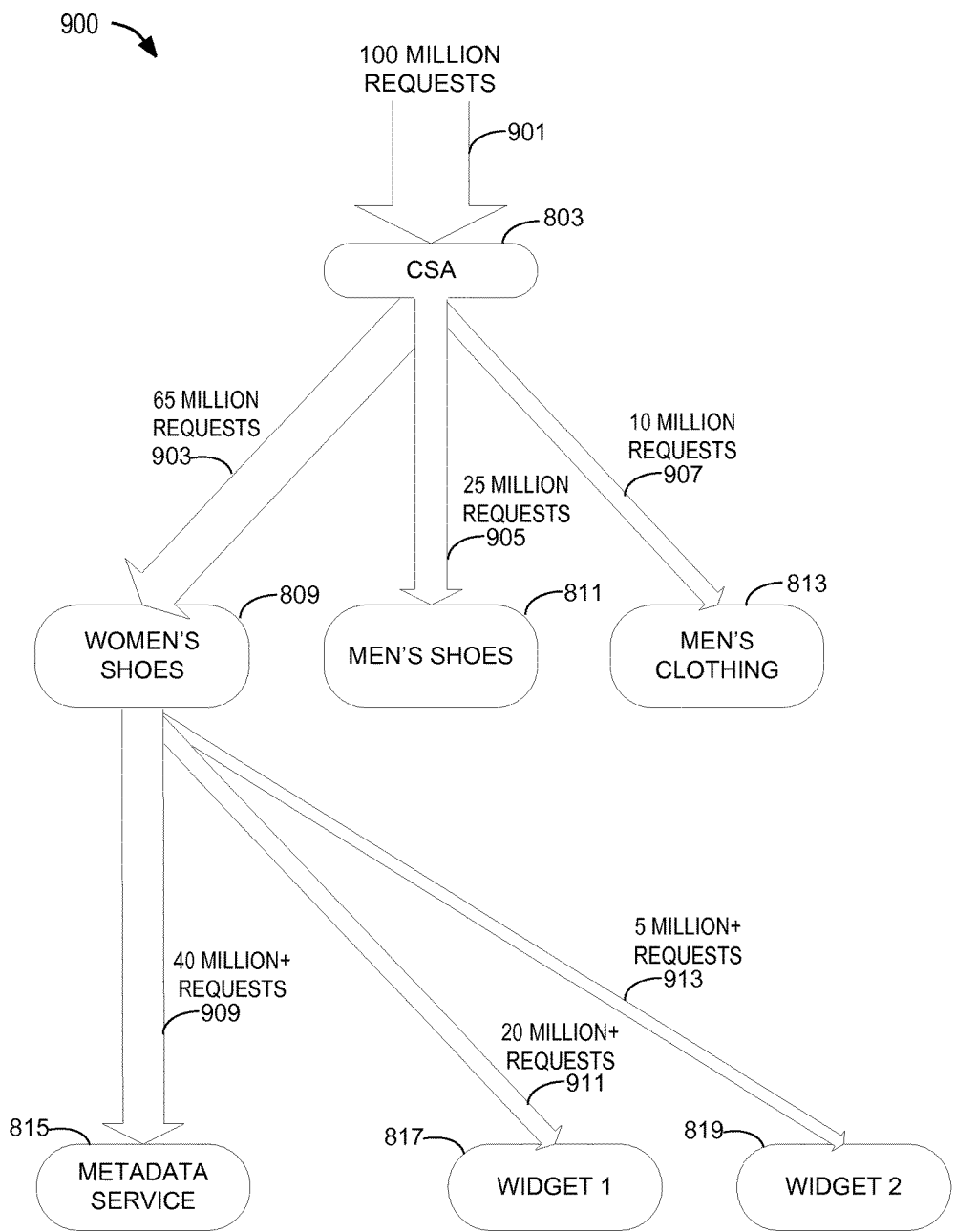
FIG. 9 shows a detailed portion of a request-level tracking within the exemplary diagram of the matrix dependency map according to FIG. 8.

With continued reference to FIG. 8 and reference now to FIG. 9, a detailed portion of a request-level tracking within the exemplary diagram of the matrix dependency map 800 is shown. For example, assume 100 million requests 901 per day come into the CSA page 803. Of the 100 million requests 901, 65 million requests 903 are then directed to the women's shoes page 809, 25 million requests 905 are directed to the men's shoes page 811, and 10 million requests 907 are directed to the men's clothing page 813.

In this example, of the 65 million requests 903 per day for the women's shoes page 809, 40 million requests 909 are directed to the metadata service module 815, 20 million requests 911 are directed to the first widget 817, and the remaining 5 million requests 913 are routed to the second widget 819. As discussed above, metadata are tracked, collected, and stored for each of these requests. As is recognizable by a skilled artisan, of the 65 million requests 903 per day for the women's shoes page 809, the metadata service module 815, the first widget 817, and the second widget 819, may each be called by the full 65 million requests, or even more, simply depending upon how frequently each module is accessed. Consequently, in the exemplary embodiment of FIG. 9, each of the lower level totals are indicated by a "+" following the total number thus accounting for the variable access possibility.

Of course, a skilled artisan will recognize that many of the requests may simply be terminated by the end-user prior to routing. However, the overall numbers of terminated requests are quite small but can still be accounted for in the collected metadata.

Depending upon chosen metrics, the average performance metrics may be chosen to be close (e.g., within 10% of the value) to the $99^{th}$ percentile metrics as a quality indication of system performance. For example, assume the collected metadata indicate that rendering the CSA page 803 takes 5 seconds on average and 5½ seconds to be performed within the $99^{th}$ percentile. Should the time to generate the CSA page 803 exceed 5½ seconds, the system engineer or operator can track back through the metadata to determine a root-cause performance analysis of why the request to render the CSA page 803 took longer than established metrics. Similar performance evaluations may be performed based independently on the various indicators such as average performance metrics and median performance metrics. If the performance metric (e.g., time) exceeds an established value for any of the metrics, then preventive or corrective action may be taken at the appropriate point on the system. The harvested data provides both a location and one or more suspect components (e.g., physical or logical components) to troubleshoot the problem and prevent further recurrences or improve the overall system metrics.

From these data, a system architect or system engineer maintaining the system can know which service or services may be failing and back through the generated metadata for instance level information to determine where problems either are occurring or soon may be occurring. The UID signal tacking and recording allows sufficient granularity to make these, and other, determinations.

Thus, based on the collected metadata there are at least two possible generalized outputs: (1) a request-level dependency matrix; and (2) an aggregated call-trace. The request-level dependency matrix provides a high-level of granularity with metadata available from each physical and logical components within the system. This level of granularity allows precise decisions to be made with regard to, for example, an instance level to determine precisely where a problem is occurring or may soon occur, which component or components are most in need of repair or updating (e.g., triaging schedules), debugging of faulty code or components, capacity utilization (e.g., a consideration of whether additional hardware components should be installed in certain geographical regions), or which components or functions are suitable to be placed in a third-party cloud.

The aggregated call-trace output, although not providing the level of granularity required by many of the functions possible from the request-level dependency matrix, can provide useful, albeit generalized, output statistics. For example, the aggregated call-trace output can provide an overall health check on the enterprise system in terms of average throughput and rendering times.

Although the one or more modules have been defined in terms of a variety of individual modules and engines, a skilled artisan will recognize that many of the items or components can be combined or organized in other ways. Also, a description of an item or component in a singular sense (e.g., a server) can also be operationally understood as indicating more than one of the item or component (e.g., a plurality of servers). Conversely, items indicated in a plural sense (e.g., harvesters) can also be understood in certain embodiments as being a single item (e.g., a harvester). The description given herein simply provides an exemplary embodiment to aid the reader in an understanding of the systems and methods used herein.

Additionally, various embodiments discussed herein may be combined, or elements selectively chosen to be adapted into a new embodiment. Thus, many more permutations are possible beyond those explicitly discussed.

Therefore, while various embodiments of the inventive subject matter are described with reference to assorted implementations and exploitations, it will be understood that these embodiments are illustrative only and that a scope of the inventive subject matter is not limited merely to those described embodiments. Moreover, the item selection systems and methods described herein may be implemented with facilities consistent with any hardware system or hardware systems either defined herein or known independently in the art using techniques described herein. Many variations, modifications, additions, and improvements are therefore possible.

Modules, Components, and Logic

Additionally, certain embodiments described herein may be implemented as logic or a number of modules, components, or mechanisms. A module, logic, component, or mechanism (collectively referred to as a "module") may be a tangible unit capable of performing certain operations and is configured or arranged in a certain manner. In certain exemplary embodiments, one or more computer systems (e.g., a standalone, client, or server computer system) or one or more components of a computer system (e.g., a processor or one or more processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by cost and time considerations.

Accordingly, the term module should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Exemplary Machine Architecture and Machine-Readable Storage Medium

Figure 10:
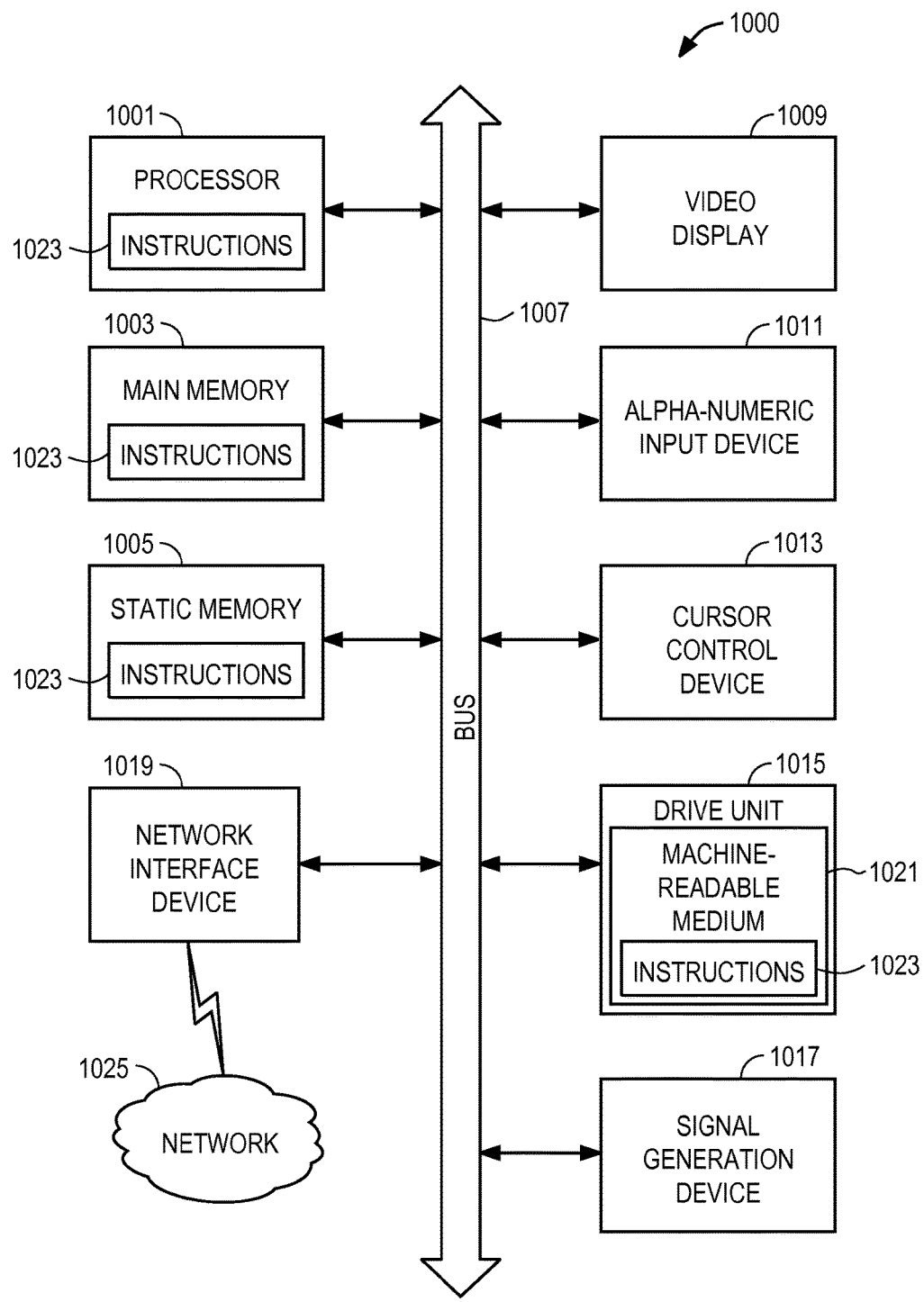
FIG. 10 is a simplified block diagram of a machine in an exemplary form of a computing system within which a set of instructions, for causing the machine to perform any one or more of the methodologies discussed herein, may be executed.

With reference to FIG. 10, an exemplary embodiment extends to a machine in the exemplary form of a computer system 1000 within which instructions, for causing the machine to perform any one or more of the methodologies discussed herein, may be executed. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1000 includes a processor 1001 (e.g., a central processing unit (CPU), a graphics processing unit (GPU) or both), a main memory 1003 and a static memory 1005, which communicate with each other via a bus 1007. The computer system 1000 may further include a video display unit 1009 (e.g., a liquid crystal display (LCD) or a cathode ray tube (CRT)). The computer system 1000 also includes an alphanumeric input device 1011 (e.g., a keyboard), a user interface (UI) navigation device 1013 (e.g., a mouse), a disk drive unit 1015, a signal generation device 1017 (e.g., a speaker), and a network interface device 1019.

Machine-Readable Medium

The disk drive unit 1015 includes a non-transitory machine-readable medium 1021 on which is stored one or more sets of instructions and data structures (e.g., software 1023) embodying or used by any one or more of the methodologies or functions described herein. The software 1023 may also reside, completely or at least partially, within the main memory 1003 or within the processor 1001 during execution thereof by the computer system 1000; the main memory 1003 and the processor 1001 also constituting machine-readable media.

While the non-transitory machine-readable medium 1021 is shown in an exemplary embodiment to be a single medium, the term "non-transitory machine-readable medium" may include a single medium or multiple media (e.g., a centralized or distributed database, or associated caches and servers) that store the one or more instructions. The term "non-transitory machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures used by or associated with such instructions. The term "non-transitory machine-readable medium" shall accordingly be taken to include, but not be limited to, solid-state memories, and optical and magnetic media. Specific examples of non-transitory machine-readable media include non-volatile memory, including by way of exemplary semiconductor memory devices (e.g., EPROM, EEPROM, and flash memory devices); magnetic disks such as internal hard disks and removable disks; magneto-optical disks; and CD-ROM and DVD-ROM disks.

Transmission Medium

The software 1023 may further be transmitted or received over a communications network 1025 using a transmission medium via the network interface device 1019 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the exemplary configurations may be implemented as a combined structure or resource. Similarly, structures and functionality presented as a single resource may be implemented as separate resources.

These and other variations, modifications, additions, and improvements fall within a scope of the inventive subject matter as represented by the appended claims. The specification and drawings are, accordingly, to be regarded in an illustrative rather than a restrictive sense.

What is claimed is:

1. A system, comprising:
   memory configured to store instructions;
   a plurality of physical components; and
   one or more processors operatively coupled to the memory, the one or more processors being configured to, in response to executing the instructions, cause performance of operations comprising:
   logging each of the plurality of physical components involved in each of a plurality of software calls during a runtime operation of an enterprise environment within the system;

generating a dependency map that includes each of the plurality of physical components of the system that are used to execute the plurality of software calls during the runtime operation within the system;

annotating each of the plurality of physical components of the system with metadata that is indicative of each of the plurality of physical components of the system;

logging, in the dependency map, a reliance of each of the plurality of the physical components of the system on others of the plurality of the physical components of the system;

injecting a unique identifier (UID) signal into the system;

tracing the UID signal using the dependency map as the UID signal travels through the plurality of physical components of the system during the runtime operation operation, wherein the metadata that is indicative of each of the plurality of physical components of the system is associated with the UID signal; and making a determination of any errors encountered in the plurality of physical components during the tracing.

2. The system of claim 1, the dependency map indicating layers tracked in each of the plurality of software calls.

3. The system of claim 2, wherein the dependency map further includes the reliance of each of the plurality of the physical components of the system on others of the plurality of the physical components of the system underlying each of the plurality of software calls.

4. The system of claim 1, the operations further comprising performing statistical analysis on selected ones of the plurality of software calls, the statistical analysis being based on the tracked layers within the system.

5. The system of claim 1, the operations further comprising:
   determine and record each of one or more paths accessed by each of the plurality of software calls to a subsequent one of the plurality of the physical components of the system from a prior component of the system; and
   record a time to access each of the one or more paths.

6. A method, comprising:
   tracking, during a runtime operation of an enterprise environment in a system, layers through which each of a plurality of software calls passes, the tracking including:
      logging each of a plurality of physical components of the system involved in each of the plurality of software calls during a runtime operation of the enterprise environment within the system;
      generating a dependency map that includes each of the plurality of physical components of the system that are used to execute the plurality of software calls during the runtime operation within the system;
      annotating each of the plurality of physical components with metadata that is indicative of each of the plurality of physical components of the system;
      logging, in the dependency map, a reliance of each of the plurality of the physical components of the system on others of the plurality of the physical components of the system;
      injecting a unique identifier (UID) signal into the system;
      tracing the UID signal using the dependency map as the UID signal travels through the plurality of physical components of the system during the runtime operation, wherein the metadata that is indicative of each of the plurality of physical components of the system is associated with the UID signal; and
      making a determination of any errors encountered in the plurality of physical components during the tracing.

7. The method of claim 6, further comprising:
   logging each of a plurality of logical components involved in each of the plurality of software calls.

8. The method of claim 7, further comprising making a determination of any errors encountered in the plurality of physical components of the system and the plurality of logical components during the tracking.

9. The method of claim 7, the dependency map indicating the logged reliance of each of the plurality of the physical components of the system and the logical components on others of the plurality of the physical components of the system and the logical components underlying the plurality of software calls.

10. The method of claim 9, wherein the dependency map further indicates each of the plurality of physical components of the system and the logical components tracked in the plurality of software calls.

11. The method of claim 6, the dependency map indicating the layers tracked in each of the plurality of software calls.

12. The method of claim 6, wherein the annotating of each of the plurality of physical components with metadata includes:
   recording a version of code under which each of the plurality of physical components of the system is running; and
   recording each of one or more applications running on each of the plurality of physical components of the system.

13. The method of claim 6, wherein the annotating includes:
   determining and recording one or more paths accessed by each of the plurality of software calls to a subsequent one of the plurality of the physical components of the system from a prior component; and
   recording a time to access each of the one or more paths.

14. The method of claim 6, further comprising based on a determination that errors were encountered, logging each of the errors.

15. The method of claim 6, wherein the tracking of each of the plurality of software calls can be started at any point within the enterprise environment.

16. A non-transitory computer-readable storage medium storing instructions, the instructions, in response to being executed by one or more processors, cause a system to perform operations comprising:
   tracking, during a runtime operation of an enterprise environment, layers through which each of a plurality of software calls passes, the tracking including:
      logging each of a plurality of physical components of a system involved in the plurality of software calls during the runtime operation of the enterprise environment within the system;
      annotating each of the plurality of physical components of the system with metadata that is directly indicative of each of the plurality of physical components of the system;
      logging a reliance of each of the plurality of the physical components of the system on others of the plurality of the physical components of the system;
      injecting a unique identifier (UID) signal into the system;
      tracing the UID signal using the dependency map as the UID signal travels through the plurality of physical components of the system during the runtime operation, wherein the metadata that is indicative of each of the plurality of physical components of the system is associated with the UID signal; and making a determination of any errors encountered in the plurality of physical components of the system during the tracing.

17. The non-transitory computer-readable storage medium of claim 16, wherein the operations further comprise performing statistical analysis on selected ones of the plurality of software calls.

18. The non-transitory computer-readable storage medium of claim 16, wherein the operations further comprise preparing generalized statistics regarding the enterprise environment.

19. The system of claim 1, wherein injecting the UID signal into the system comprises receiving a software call to execute in the system during the runtime operation.

20. The system of claim 19, wherein tracing the UID signal using the dependency map as the UID signal travels through the plurality of physical components of the system during the runtime operation comprises:

identifying the plurality of physical components of the system that are used to execute the software call; and associating, with the software call, the plurality of physical components of the system that are used to execute the software call.

\* \* \* \* \*